US010902046B2

(12) United States Patent
Carrier et al.

(10) Patent No.: US 10,902,046 B2
(45) Date of Patent: Jan. 26, 2021

(54) BREAKING DOWN A HIGH-LEVEL BUSINESS PROBLEM STATEMENT IN A NATURAL LANGUAGE AND GENERATING A SOLUTION FROM A CATALOG OF ASSETS

(71) Applicant: INTERNATIONAL BUSINESS MACHINES CORPORATION, Armonk, NY (US)

(72) Inventors: Scott R. Carrier, Apex, NC (US); Brendan Bull, Durham, NC (US); Aysu Ezen Can, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 16/204,305

(22) Filed: Nov. 29, 2018

(65) Prior Publication Data
US 2020/0175051 A1    Jun. 4, 2020

(51) Int. Cl.
| | | |
|---|---|---|
| G06F 7/00 | (2006.01) |
| G06F 16/35 | (2019.01) |
| G06N 5/02 | (2006.01) |
| G06F 9/54 | (2006.01) |
| G06F 16/31 | (2019.01) |
| G06F 16/332 | (2019.01) |

(Continued)

(52) U.S. Cl.
CPC .............. *G06F 16/358* (2019.01); *G06F 9/54* (2013.01); *G06F 16/322* (2019.01); *G06F 16/3326* (2019.01); *G06F 40/205* (2020.01); *G06N 5/02* (2013.01); *G06Q 10/063* (2013.01)

(58) Field of Classification Search
CPC .. G06F 16/358; G06F 17/2705; G06F 16/322; G06F 16/3326
USPC ................................ 707/736, 737, 741, 798
See application file for complete search history.

(56) References Cited

U.S. PATENT DOCUMENTS

| | | |
|---|---|---|
| 7,114,146 B2 | 9/2006 | Zhang et al. |
| 7,346,888 B1 | 3/2008 | Srinivasan et al. |
| 8,949,773 B2 | 2/2015 | Paradkar et al. |

(Continued)

OTHER PUBLICATIONS

Can, "Exploiting Concepts in Videos for Video Event Detection", Doctoral Dissertations, 455, 2015, pp. 1-150.

(Continued)

*Primary Examiner* — Md I Uddin
(74) *Attorney, Agent, or Firm* — Dmitry Paskalov

(57) ABSTRACT

The present invention includes a computing device that may receive a business problem in a natural language. The computing device may determine a domain classification from the business problem, where the domain classification is a list of domains determined from an application programming interface (API) catalog. The computing device may generate a problem graph from the business problem, where the problem graph is a parsed tree of natural language elements extracted from the natural language and stored as a database. The computing device may retrieve one or more assets from the plurality of assets based on the domain classification and the problem graph. The computing device may generate a problem-solution graph from the one or more assets and generate a solution API pipeline graph for evaluation by a user and compilation by a pipeline assembler.

17 Claims, 7 Drawing Sheets

(51) Int. Cl.
*G06Q 10/06* (2012.01)
*G06F 40/205* (2020.01)

(56) References Cited

U.S. PATENT DOCUMENTS

| | | |
|---|---|---|
| 9,823,950 B1 | 11/2017 | Carrier et al. |
| 2009/0210390 A1 | 8/2009 | Lane |
| 2014/0108321 A1* | 4/2014 | Buchanan ............... G06N 5/02 706/50 |
| 2016/0004973 A1 | 1/2016 | Trenkov et al. |
| 2016/0019102 A1 | 1/2016 | Cui et al. |

OTHER PUBLICATIONS

Chen et al., "Personalized QoS-Aware Web Service Recommendation and Visualization", IEEE Transactions on Services Computing, vol. 6, No. 1, Jan.-Mar. 2013, pp. 35-47.

Chen et al., "RegionKNN: A Scalable Hybrid Collaborative Filtering Algorithm for Personalized Web Service Recommendation", 2010 IEEE International Conference on Web Services, pp. 9-16.

Ezen-Can et al., "Understanding Student Language: An Unsupervised Dialogue Act Classification Approach", Journal of Educational Data Mining, vol. 7, No. 1, 2015, pp. 51-78.

Friedrich et al., "Process Model Generation from Natural Language Text", CAiSE 2011, LNCS 6741, pp. 482-496, 2011.

Jiang et al., "An Effective Web Service Recommendation Method based on Personalized Collaborative Filtering", 2011 IEEE International Conference on Web Services, pp. 211-218.

Mazloom et al., "Encoding Concept Prototypes for Video Event Detection and Summarization", ICMR'15, Jun. 23-26, 2015, Shanghai, China, pp. 1-8.

Metzler et al., "A Markov Random Field Model for Term Dependencies", SIGIR'05, Aug. 15-19, 2005, Salvador, Brazil, pp. 472-479.

Yao et al., "Recommending Web Services via Combining Collaborative Filtering with Content-based Features", 2013 IEEE 20th International Conference on Web Services, p. 42-49.

Yau et al., "QoS-based Service Ranking and Selection for Servic-based Systems", accessed Nov. 27, 2018, pp. 1-8.

Zheng et al., "QoS-Aware Web Service Recommendation by Collaborative Filtering", IEEE Transactions on Services Computing, vol. 4, No. 2, Apr.-Jun. 2011, pp. 140-152.

Zheng et al., "WSRec: A Collaborative Filtering Based Web Service Recommender System", 2009 IEEE International Conference on Web Services, pp. 437-444.

Mell et al., "The NIST Definition of Cloud Computing," National Institute of Standards and Technology, Sep. 2011, p. 1-3, Special Publication 800-145.

* cited by examiner

BREAKING DOWN A HIGH-LEVEL BUSINESS PROBLEM STATEMENT IN A NATURAL LANGUAGE AND GENERATING A SOLUTION FROM A CATALOG OF ASSETS

BACKGROUND

The present invention relates, generally, to the field of computing, and more particularly to generating a solution from a catalog of application programming interfaces (APIs) based on analyzing a natural language problem using natural language processing (NLP).

NLP is performed using cloud-based cognitive systems. Cognitive systems are evolving towards a micro-service architecture that publishes an ecosystem of service APIs. These service APIs are each designed to perform a specific function, where the service API functions are combined to form complex operations or services that produce an overall result. The combination functions of existing services or APIs may be accomplished (e.g., via API chaining) by hard-coding (and compiling) the desired sequence of APIs based on the specific input and output data passing between them. For example, IBM Watson® (IBM Watson and all IBM Watson-based trademarks and logos are trademarks or registered trademarks of International Business Machines Corporation and/or its affiliates) may be configured as an NLP cognitive system for medical, financial, or client data analysis.

Knowledge base service APIs designed for question answering that may have the capabilities to apply advanced natural language processing, information retrieval, knowledge representation, automated reasoning, and machine learning technologies to the field of open domain analysis and question answering. The question answering technology is different from a document search technology in that a document search takes a keyword query and returns a list of documents, ranked in order of relevance to the query typically based on popularity and page ranking, while question answering technology takes a question expressed in a natural language, seeks to understand it in much greater detail, and returns a precise answer to the question. Typically, the precise answer to the question is based on different techniques applied in a certain sequence that are used to analyze natural language, identify sources, find and generate hypotheses, find and score evidence, merge and rank hypotheses, and pick the hypothesis with a highest rank as the precise answer.

SUMMARY

According to one embodiment, a method, computer system, and computer program product for generating a solution from a plurality of assets is provided. The present invention includes a computing device that may receive a business problem in a natural language. The computing device may determine a domain classification from the business problem, where the domain classification is a list of domains determined from an application programming interface (API) catalog. The computing device may generate a problem graph from the business problem, where the problem graph is a parsed tree of natural language elements extracted from the natural language and stored as a database. The computing device may retrieve one or more assets from the plurality of assets based on the domain classification and the problem graph. The computing device may generate a problem-solution graph from the one or more assets and generate a solution API pipeline graph for evaluation by a user and compilation by a pipeline assembler.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
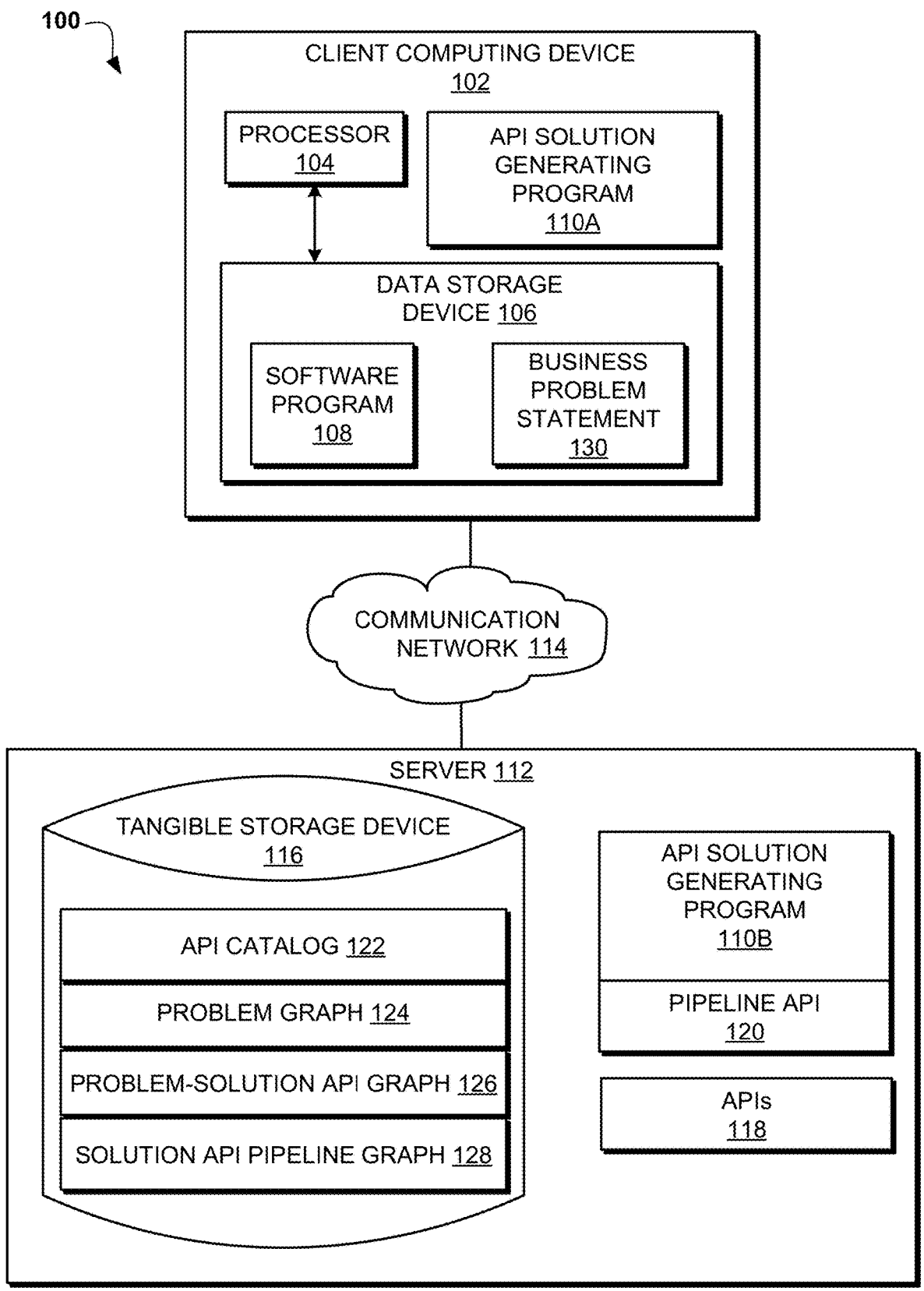
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to generating a solution from a catalog of application programming interfaces (APIs) based on analyzing a natural language problem using a natural language processing (NLP). The following described exemplary embodiments provide a system, method, and program product to, among other things, receive a business problem in a natural language and, by extracting the domain and a problem graph, construct a pipeline of existing APIs that provides a solution to the business problem after compilation. Therefore, the present embodiment has the capacity to improve the technical field of providing a solution to the business problem described in a natural language by autonomous, NLP based API chaining of existing APIs and not by hard-coding the desired sequence and therefore reduces the time and cost of providing the desired services to the clients.

As previously described, NLP is performed using cloud-based cognitive systems. Cognitive systems are evolving towards a micro-service architecture that publishes an ecosystem of service APIs. These service APIs are each designed to perform a specific function, where the service API functions are combined to form complex operations or services that produce an overall result. The combination functions of existing services or APIs may be accomplished (e.g., via API chaining) by hard-coding (and compiling) the desired sequence of APIs based on the specific input and output data passing between them.

Typically, NLP, or other services, include a plurality of service APIs that are used to solve a business problem. Generally, in order to construct a solution to a business problem, a user is required to search among hundreds of services for APIs that are applicable to the problem and then manually program the sequencing. This process is, typically, a time-consuming task that requires not only a business person that may articulate the exact problem that needs to be addressed, but also a team of computer scientists that would brake the business problem into services that are available in the catalog among hundreds of registered APIs. As such, it may be advantageous to, among other things, implement a system that receives a business problem in a natural language and, based on the domain classification and problem decomposition of the business problem, assembles a solution to the problem from the registered in the API catalog services.

According to one embodiment, an API solution generating program registers and analyzes all available APIs in order to classify and arrange them based on available documentation and prior usage of each API. Then, after the API solution generating program receives a business problem in a natural language, the API solution generating program determines a domain of the business problem and generates a corresponding problem graph using a knowledge base that enables the assembly of a problem-solution graph from the existing registered APIs that afterwards may be compiled into a specific solution service by using a pipeline assembly method.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, a processor-implemented method, and program product to generate a solution to a business problem stated in a natural language by utilizing NLP and available API services.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host a business problem statement 130 and run a software program 108 and an API solution generating program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively. Business problem statement 130 may be a text file, a word document or other type of storage file type that may store a business problem statement entered by a user on a client computing device 102.

The server computer 112 may be a laptop computer, netbook computer, personal computer (PC), a desktop computer, or any programmable electronic device or any network of programmable electronic devices capable of hosting and running an API solution generating program 110B, APIs 118 and a tangible storage device 116 and communicating with the client computing device 102 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, API solution generating program 110A, 110B may incorporate or invoke pipeline API 120 program that is configured to access problem-solution API graph 126, and determine, evaluate and compile a solution API pipeline graph 128 to generate a solution based on a user provided statement in natural language. The pipeline API 120 program is configured to access API catalog 122 that incorporates data of all the available APIs 118 that were previously registered in a registry, and readily assemble APIs 118 in various combinations to form API pipelines (or sequences) that may be referenced by other consumers in solution API pipeline graph 128. The pipeline API 120 program may utilize a common object model, where consumers (e.g., users, applications, commands, etc.) post data to a solution API pipeline graph 128 indicating the desired pipeline for execution, and an aggregated response object (of the common object model) is returned providing results. The underlying APIs 118 within the pipeline in a solution API pipeline graph 128 may optionally act upon data returned by upstream APIs and/or simply pass the data through to subsequent APIs (or nodes) within the pipeline.

According to the present embodiment, APIs 118 may be all the APIs registered in API catalog 122 that are used by services operated on server 112. For example, server 112 may use IBM Watson® services for NLP processing that include hundreds of APIs that analyze, compare, classify, and record data received in a natural language.

According to the present embodiment, tangible storage device 116 may host and run databases and records, such as API catalog 122, problem graph 124, problem solution API graph 126, and solution API pipeline graph 128. According to an example embodiment, API catalog 122 may be a database that records all the available APIs 118 in a database format that includes fields such as API name, domain, API input values and format, API output values and format, API ranking, dependent APIs, usage statistics, and usage statistics within the domain and other values required to prioritize and assemble a pipeline (an executable sequence of APIs) based on solution API pipeline graph 128. Steps required for generating API catalog 122 will be explained in further detail below with respect to FIG. 2B.

According to the present embodiment, problem graph 124, problem-solution API graph 126, and solution API pipeline graph 128 may be a single database, a set of databases, a structured file or any other digital representation of a visual problem graph determined by an API solution generating program 110A, 110B from the business problem statement 130, that was received from client computing device 102 via communication network 114. Problem graph 124 may be a parsed tree of natural language elements stored as a database where each element represent a concept in a natural language taken from the business statement. In addition, each element is arranged in a logical sequence determined by the business statement. For example, a business statement "I want UMLS concept detection and oncology attribute detection" may be converted to a problem graph that has two elements, "UMLS concept detection" and "oncology attribute detection".

According to the present embodiment, the API solution generating program 110A, 110B may be a program capable of receiving a business problem statement 130 (BPS) in natural language, determining domain classification, and generating a solution based on generated problem graph. The API solution generating method is explained in further detail below with respect to FIG. 2A.

Figure 2:
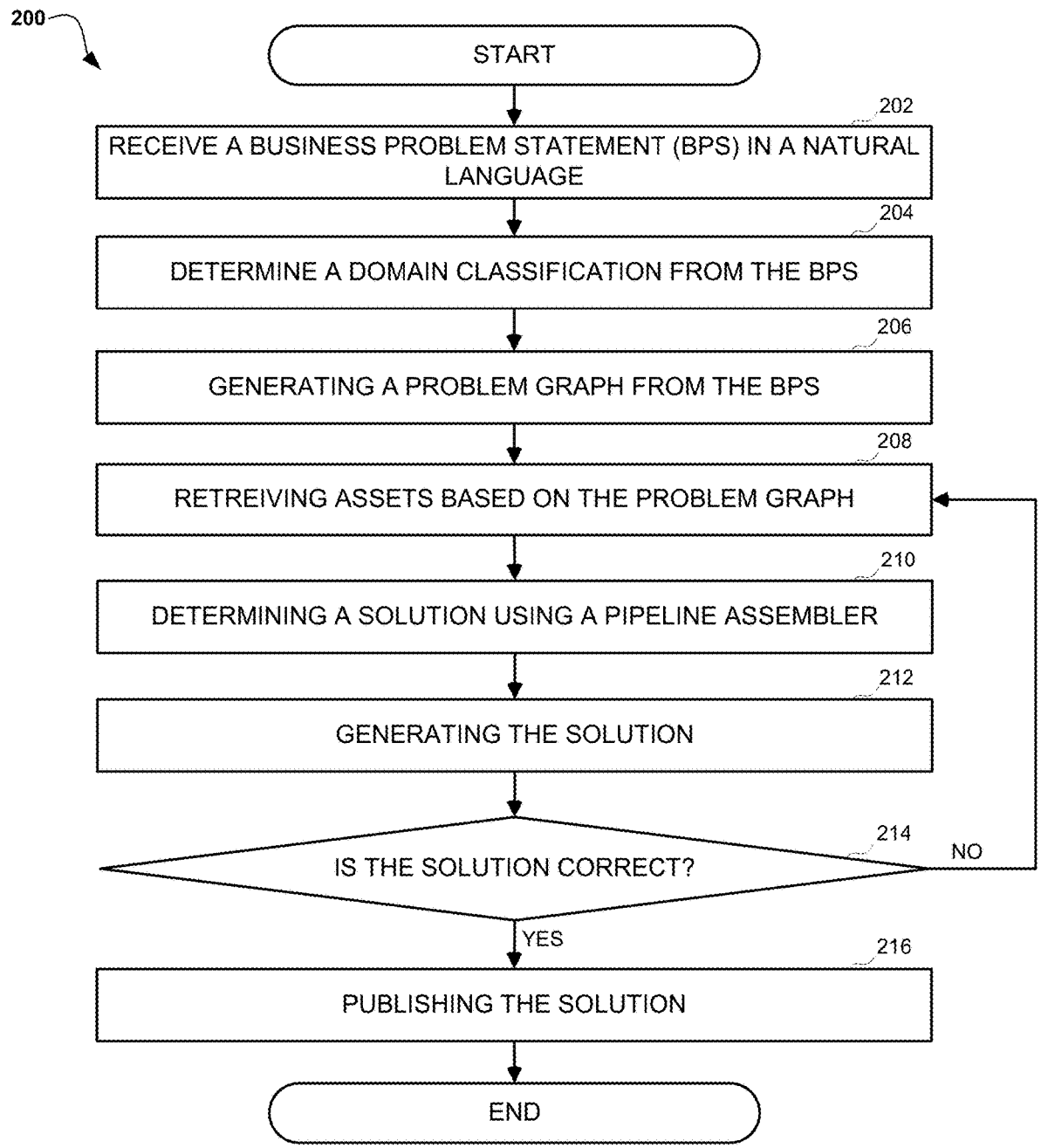
FIG. 2 is an operational flowchart illustrating an API solution generating process, according to at least one embodiment.

Referring now to FIG. 2, an operational flowchart illustrating an API solution generating process 200 is depicted according to at least one embodiment. At 202, the API solution generating program 110A, 110B receives a BPS in a natural language. According to an example embodiment, the API solution generating program 110A, 110B may receive or access the business problem statement 130 from client computing device 102. For example, BPS may include the following: "I want to build a system that can identify patients who needs to be screened for cancer per the NIH guidelines". In another embodiment, the API solution generating program 110A, 110B may receive or record the BPS directly from a user using voice recorder or microphone and generate the BPS 124 as a text, using speech-to-text techniques.

Next, at 204, API solution generating program 110A, 110B determines a domain classification from the BPS. According to an example embodiment, the API solution generating program 110A, 110B may determine the domain classification using one of the NLP services of IBM Watson® or other word embedding or vectorization techniques. To continue the previous example, the API solution generating program 110A, 110B would extract "cancer" from the BPS meaning that the domain classification is medical and not another analytics classification, such as finance, law, or social analytics.

Next, at 206, API solution generating program 110A, 110B generates a problem graph from the BPS. According to an example embodiment, the API solution generating program 110A, 110B may generate a problem graph 124 by analyzing the BPS to classify the problem components in order to determine dependencies. To continue the previous example, the API solution generating program 110A, 110B may determine, using the same techniques as used in the domain determination, that a service requires (a) to extract medical entities from patient records and (b) to evaluate patient data against a set of guidelines.

Next, at 208, API solution generating program 110A, 110B retrieves assets based on the problem graph 124. According to an example embodiment, the API solution generating program 110A, 110B may search the API catalog 122 to identify and receive the APIs from APIs 118 that are required in order to generate the solution. In addition, API solution generating program 110A, 110B may retrieve API sets and their dependencies based on the problem graph 124 and, as described in FIG. 2C, rank them according to a specific set of criteria, such as relevancy score and usage statistics within the domain that are available from the API catalog 122. To continue the previous example, API solution generating program 110A, 110B may analyze currently available pipelines that were used to analyze patient records and to evaluate patient data against criteria. In addition, the API solution generating program 110A, 110B may determine an abbreviation "NIH" and add Unified Medical Language System (UMLS) concept detection and UMLS concept disambiguation APIs because both of these APIs are frequently used together in the medical domain. Furthermore, API solution generating program 110A, 110B may determine that the input data would be unstructured because the BPS is silent as to any input data structure. Therefore, the retrieved APIs would be APIs designed to process unstructured data. In another embodiment, API solution generating program 110A, 110B may inform the user while making any determination using a display or a speaker by utilizing text to speech technique.

Next, at 210, API solution generating program 110A, 110B determines a solution using pipeline assembler API 120. According to an example embodiment, the API solution generating program 110A, 110B may generate a pipeline sequence from the retrieved APIs and store the sequence in problem-solution API graph 126. For example, generating program 110A, 110B may determine from the API catalog 122 all the requirement of the retrieved assets such as what are the inputs and outputs of the assets and place them in an order that streamlines the data from one API to another in order to generate a working solution.

Next, at 212, API solution generating program 110A, 110B generates the solution. According to an example embodiment, the API solution generating program 110A, 110B may compile the solution API pipeline graph 128 to generate an executable service for evaluation by a user. For example, API solution generating program 110A, 110B may call or invoke each API from problem-solution API graph 126 using uniform resource locator (URL) to perform the corresponding function, or by accessing it through API catalog 122. The pipeline API 120 may accept global and/or API-specific endpoint and query string parameters to be dynamically appended to the URL of the API to provide flexibility. When additional elements in the problem-solution API graph 126 exist, the next API is retrieved for processing.

Then, at 214, API solution generating program 110A, 110B determines whether the solution is correct. According to an example embodiment, API solution generating program 110A, 110B may display the problem graph 124, problem-solution API graph 126, and solution API pipeline graph 128 to a user through a graphical user interface (GUI) for evaluation. For example, the GUI may present the graphs as a parsed tree where each node represents an API and allow the user to search the API catalog 122 and add or rearrange the APIs in the graphs. In another embodiment, API solution generating program 110A, 110B may allow a user to try the service by uploading a template data file and inspect the results. In further embodiment, a user may be asked using GUI whether he is satisfied with the results. If the user, through user interactions with a GUI, indicates that the results are satisfactory or does not make any changes to the graphs, API solution generating program 110A, 110B may determine that the user is satisfied with the results. If the user is satisfied with the results or did not make any changes to the graphs, (step 214, "YES" branch), the API solution generating program 110A, 110B may continue to step 216 to publish the solution as one of the available API services at APIs 118. If the API solution generating program 110A, 110B determines that the user is unsatisfied with the results or made amendments to the graphs (step 214, "NO" branch), the API solution generating program 110A, 110B may return to step 208 to retrieve assets based on the problem graph. For example, if a user changed any of the graphs by adding or removing APIs or changing the sequence, the API solution generating program 110A, 110B may determine that the use is unsatisfied with the results.

Next, at 216, API solution generating program 110A, 110B publishes the solution. According to an example embodiment, the API solution generating program 110A, 110B may publish the generated from the APIs 118 solution as a new service on the user cloud platform. For example, a user cloud platform where the service may be published is an IBM Bluemix® (IBM Bluemix and all IBM Bluemix-based trademarks and logos are trademarks or registered trademarks of International Business Machines Corporation and/or its affiliates).

Figure 3:
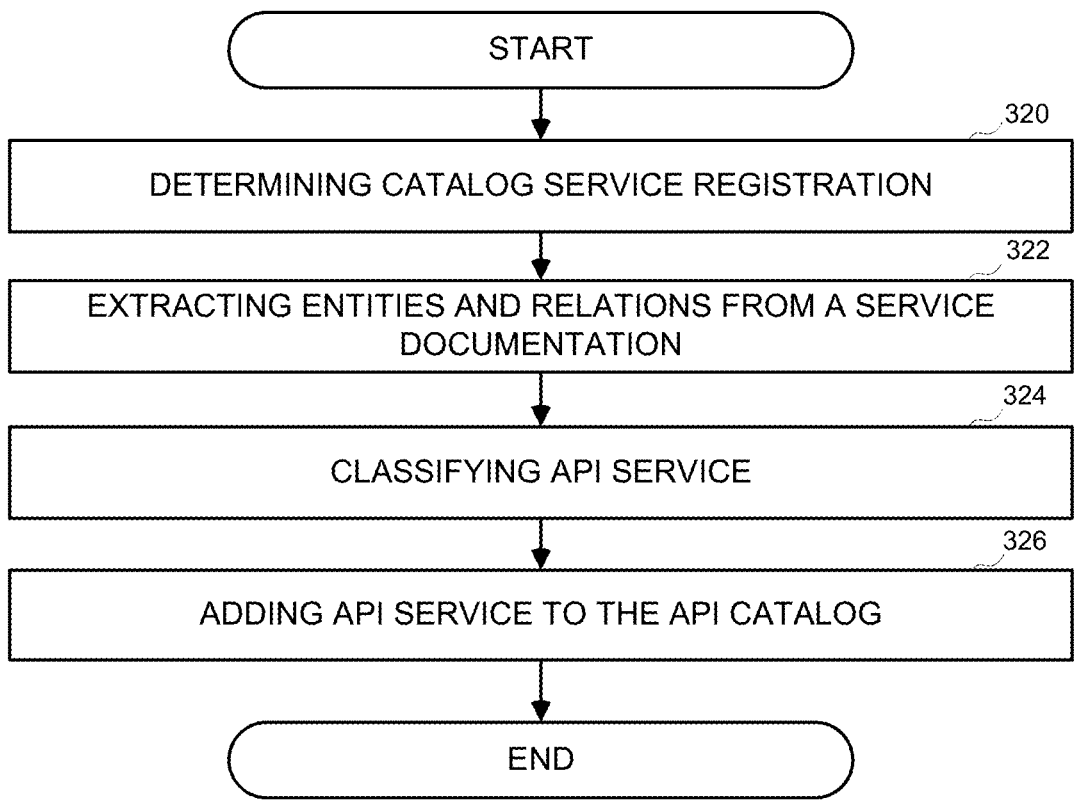
FIG. 3 is an operational flowchart illustrating a catalog service registration process according to at least one embodiment.

Referring now to FIG. 3, an initial catalog service registration process, according to at least one embodiment, is explained in further detail below with respect to FIG. 3. According to the present embodiment, asset retrieval is available based on a proper API registration in an API catalog 122. At 320, API solution generating program 110A, 110B determines catalog service registration. According to an example embodiment, the API solution generating program 110A, 110B may determine whenever a new service becomes available by periodically scanning for new APIs registered in APIs 118.

Next, at 322, API solution generating program 110A, 110B extracts entities and relations from a service documentation. According to an example embodiment, the API solution generating program 110A, 110B may analyze the documentation of the services. The service may include multiple APIs compiled together to provide a specific solution. For example, entities and their relations may be extracted using NLP and entity extractor, such as UMLS, to determine the domain, data type and format of each API in the newly registered service.

Next, at 324, API solution generating program 110A, 110B classifies the API service. According to an example embodiment, the API solution generating program 110A, 110B may classify each service available on a cloud platform where each service may incorporate one or more APIs from APIs 118. For example, API services may be classified by categories such as NLP entity-relation extraction, tone analyzer, classifier, etc.

Next, at 326, API solution generating program 110A, 110B adds the API service to the API catalog. According to an example embodiment, the API solution generating program 110A, 110B may append the API catalog 122 with the data extracted from the service registration including updating the ranking and statistics of each API in the API catalog 122.

Figure 4:
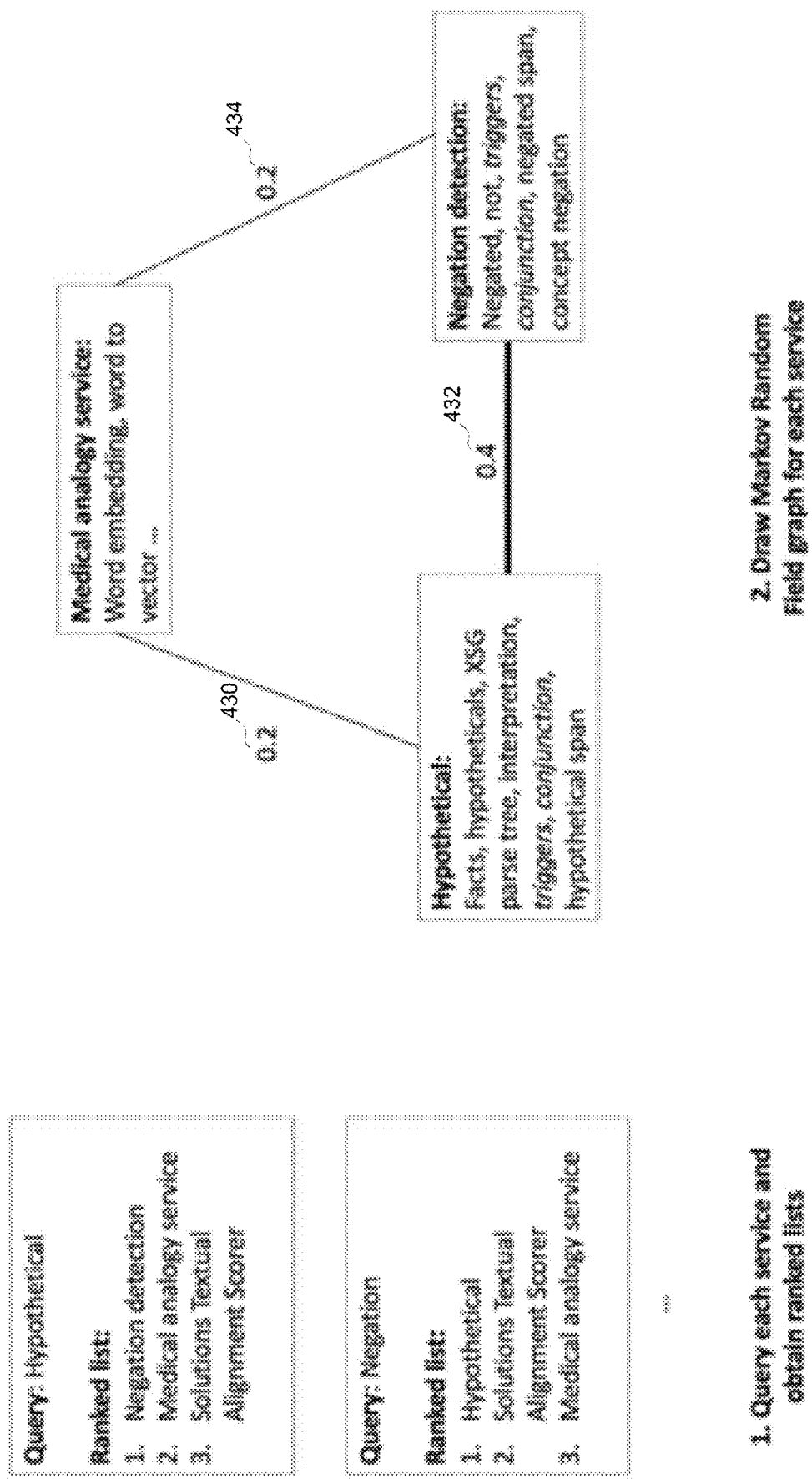
FIG. 4 is an example embodiment illustrating a dependency extraction process according to at least one embodiment.

Referring now to FIG. 4, a dependency extraction diagram is depicted according to at least one embodiment. According to an example embodiment, API solution generating program 110A, 110B may determine and display dependencies using a Markov Random Field graph, where fields 430, 432, and 434 represent percentages when both services are used frequently together. This technique may be applied to determine whether an additional API from APIs 118 has to be added to the problem-solution API graph 126 even if it was not mentioned in a business problem statement 130. According to an example embodiment, API solution generating program 110A, 110B may add additional API based on comparing the percentage of the previous usages when both API services were used together to a threshold value updated by a user. For example, is a user sets a threshold value to 35% and according to a business problem statement 130 analysis an API related to a hypothetical is used then API solution generating program 110A, 110B may determine that negation detection API is used in 40% (see 432 in FIG. 4) of cases where hypothetical assumptions are required and because 40% is more then the set threshold of 35% the negation detection API will be added to the problem-solution API graph 126.

It may be appreciated that FIGS. 2-4 provide only an illustration of one implementation and does not imply any limitations with regard to how different embodiments may be implemented. Many modifications to the depicted environments may be made based on design and implementation requirements.

Figure 5:
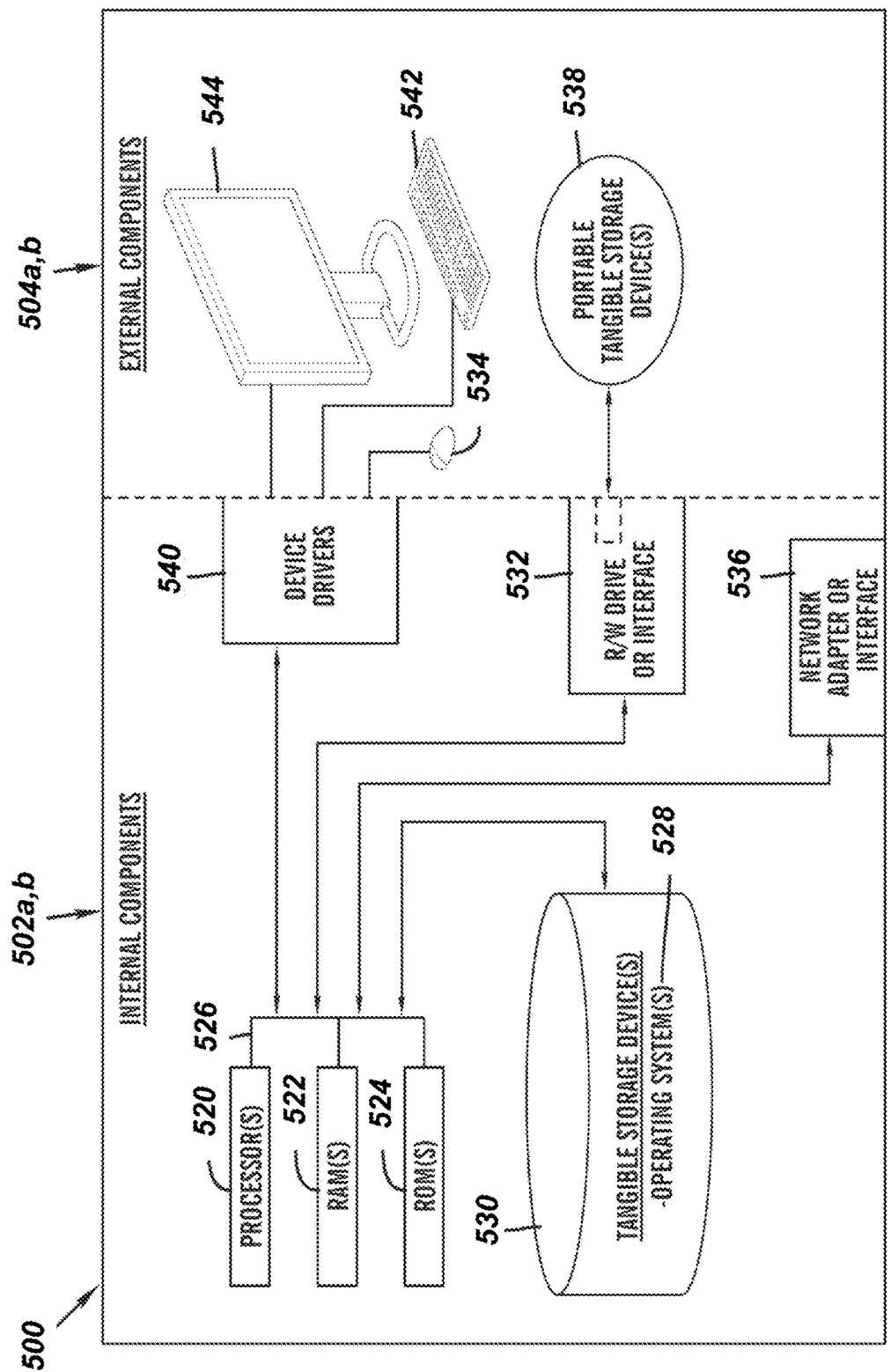
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the API solution generating program 110A in the client computing device 102, and the API solution generating program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 *a,b* also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the API solution generating program 110A, 110B, can be stored on one or more of the respective portable computer-readable tangible storage devices 538, read via the respective R/W drive or interface 532, and loaded into the respective hard drive 530.

Each set of internal components 502 *a,b* also includes network adapters or interfaces 536 such as a TCP/IP adapter cards, wireless Wi-Fi interface cards, or 3G or 4G wireless interface cards or other wired or wireless communication links. The software program 108 and the API solution generating program 110A in the client computing device 102 and the API solution generating program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the API solution generating program 110A in the client computing device 102 and the API solution generating program 110B in the server 112 are loaded into the respective hard drive 530. The network may comprise copper wires, optical fibers, wireless transmission, routers, firewalls, switches, gateway computers and/or edge servers.

Each of the sets of external components 504 *a,b* can include a computer display monitor 544, a keyboard 542, and a computer mouse 534. External components 504 *a,b* can also include touch screens, virtual keyboards, touch pads, pointing devices, and other human interface devices. Each of the sets of internal components 502 *a,b* also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
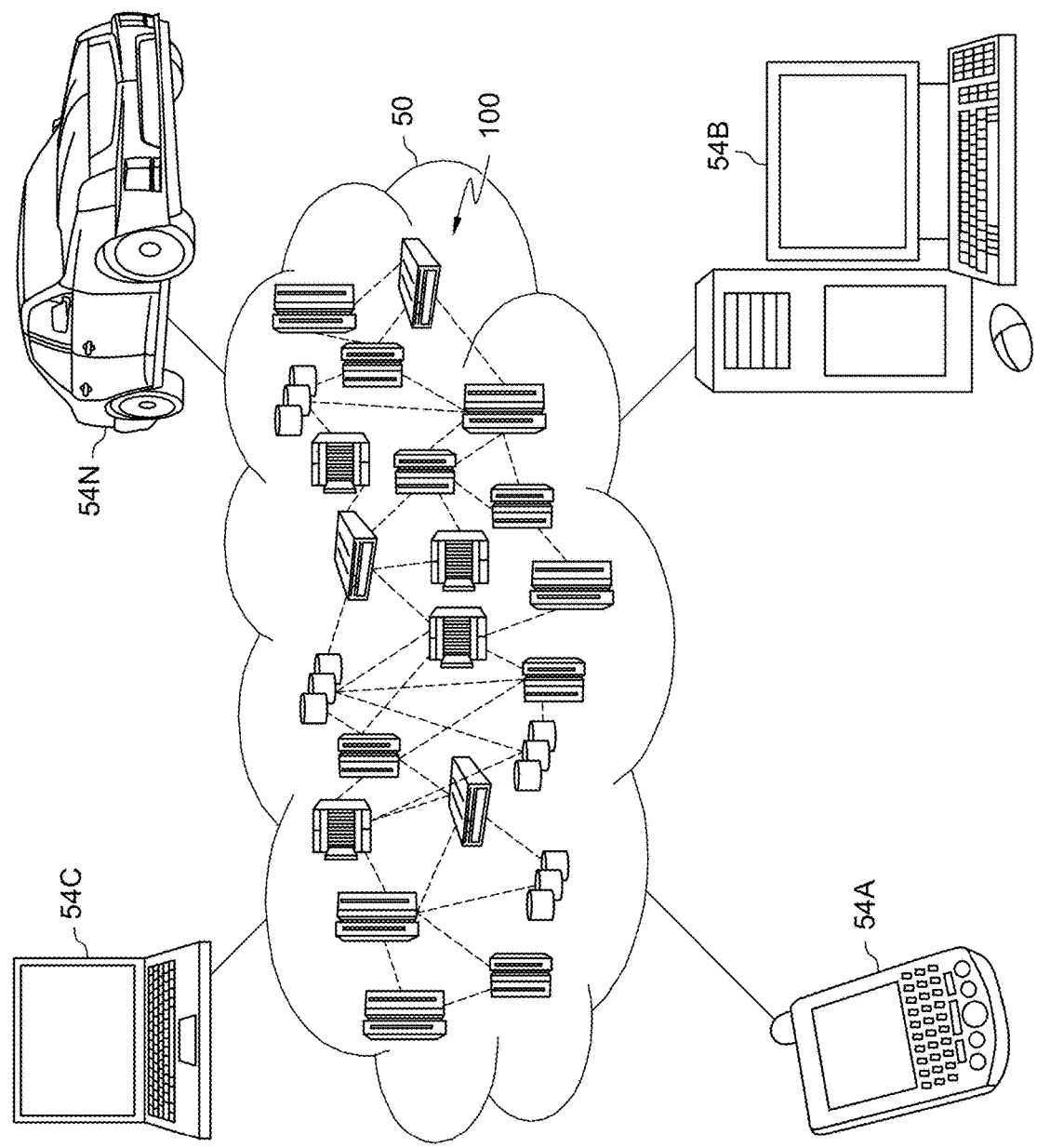
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
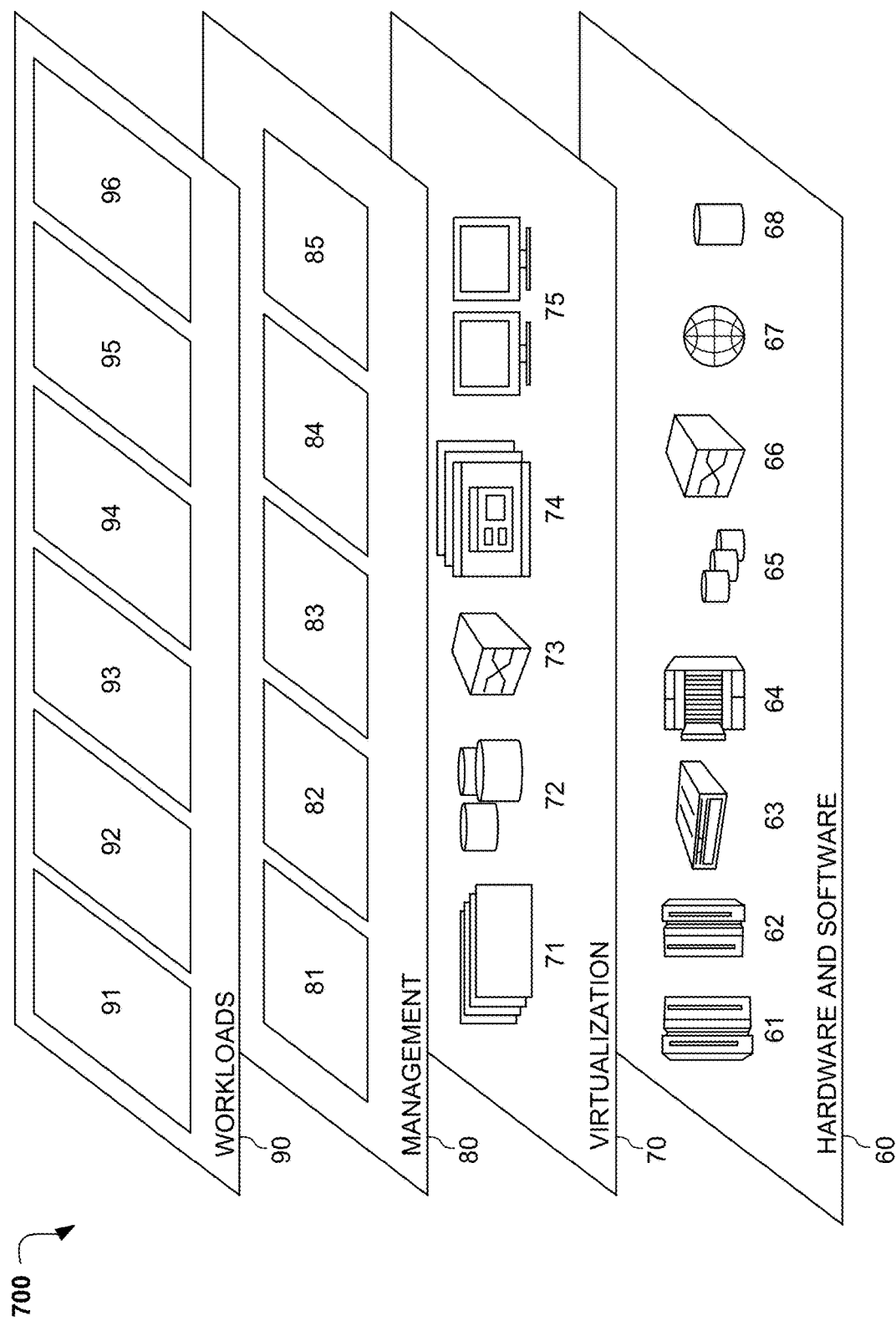
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and solution generation based on existing APIs 96. Solution generation based on existing APIs 96 may relate to receiving a problem statement in natural language and by using NLP determining a domain and generating a problem graph that may be compiled into a solution service using a pipeline assembler from existing APIs.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for generating a solution from a plurality of assets, the method comprising:
   receiving a business problem in a natural language;
   extracting entities and relations from a service documentation of a service into an application programming interface (API) catalog;
   determining a domain classification from the business problem, wherein the domain classification is a list of domains determined from the API catalog;
   generating a problem graph from the business problem, wherein the problem graph is a parsed tree of natural language elements extracted from the natural language and stored as a database, and wherein each of the natural language elements is arranged in a logical sequence determined by the business statement;
   retrieving one or more assets from the plurality of assets based on the domain classification and the problem graph, wherein retrieving one or more assets from the plurality of assets based on the domain classification and the problem graph further comprises determining a plurality of dependent assets based on comparing a percentage of usage of both assets together is above a threshold value;
   generating a problem-solution graph from the one or more assets and based on the logical sequence;
   generating a solution API pipeline graph form the problem-solution graph for evaluation by a user, wherein the solution API pipeline graph is compiled by a pipeline assembler for the evaluation by the user, and wherein the pipeline assembler streamlines the one or more assets based on inputs and outputs of each of the one or more assets; and
   based on determining that the user evaluated the solution, making the solution available as a service on a cloud platform.

2. The processor-implemented method of claim 1, further comprising:
   generating the solution based on the solution API pipeline graph.

3. The processor-implemented method of claim 2, wherein determining that the user evaluated the solution is based on presenting the problem graph to a user using graphic user interface and receiving no input from the user.

4. The processor-implemented method of claim 1, wherein determining the domain classification from the business problem is done using natural language processing.

5. The processor-implemented method of claim 1, wherein retrieving one or more assets from the plurality of assets based on the domain classification and the problem graph is performed by searching for the one or more assets in an API catalog generated during a registration of the plurality of assets.

6. The processor-implemented method of claim 1, wherein determining the solution using a pipeline assembler comprises sequencing the one or more assets from the plurality of assets in an executable order.

7. A computer system for generating a solution from a plurality of assets, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a business problem in a natural language;
extracting entities and relations from a service documentation of a service into an application programming interface (API) catalog;
determining a domain classification from the business problem, wherein the domain classification is a list of domains determined from the API catalog;
generating a problem graph from the business problem, wherein the problem graph is a parsed tree of natural language elements extracted from the natural language and stored as a database, and wherein each of the natural language elements is arranged in a logical sequence determined by the business statement;
retrieving one or more assets from the plurality of assets based on the domain classification and the problem graph, wherein retrieving one or more assets from the plurality of assets based on the domain classification and the problem graph further comprises determining a plurality of dependent assets based on comparing a percentage of usage of both assets together is above a threshold value;
generating a problem-solution graph from the one or more assets and based on the logical sequence;
generating a solution API pipeline graph form the problem-solution graph for evaluation by a user, wherein the solution API pipeline graph is compiled by a pipeline assembler for the evaluation by the user, and wherein the pipeline assembler streamlines the one or more assets based on inputs and outputs of each of the one or more assets; and
based on determining that the user evaluated the solution, making the solution available as a service on a cloud platform.

8. The computer system of claim 7, further comprising:
generating the solution based on the solution API pipeline graph.

9. The computer system of claim 8, wherein determining that the user evaluated the solution is based on presenting the problem graph to a user using graphic user interface and receiving no input from the user.

10. The computer system of claim 7, wherein determining the domain classification from the business problem is done using natural language processing.

11. The computer system of claim 7, wherein retrieving one or more assets from the plurality of assets based on the domain classification and the problem graph is performed by searching for the one or more assets in an API catalog generated during a registration of the plurality of assets.

12. The computer system of claim 7, wherein determining the solution using a pipeline assembler comprises sequencing the one or more assets from the plurality of assets in an executable order.

13. A computer program product for generating a solution from a plurality of assets, the computer program product comprising:
one or more computer-readable tangible storage medium and program instructions stored on at least one of the one or more tangible storage medium, the program instructions executable by a processor, the program instructions comprising:
program instructions to receive a business problem in a natural language;
program instructions to extract entities and relations from a service documentation of a service into an application programming interface (API) catalog;
program instructions to determine a domain classification from the business problem, wherein the domain classification is a list of domains determined from the API catalog;
program instructions to generate a problem graph from the business problem, wherein the problem graph is a parsed tree of natural language elements extracted from the natural language and stored as a database, and wherein each of the natural language elements is arranged in a logical sequence determined by the business statement;
program instructions to retrieve one or more assets from the plurality of assets based on the domain classification and the problem graph, wherein program instructions to retrieve one or more assets from the plurality of assets based on the domain classification and the problem graph further comprises program instructions to determine a plurality of dependent assets based on comparing a percentage of usage of both assets together is above a threshold value;
program instructions to generate a problem-solution graph from the one or more assets and based on the logical sequence;
program instructions to generate a solution API pipeline graph form the problem-solution graph for evaluation by a user, wherein the solution API pipeline graph is compiled by a pipeline assembler for the evaluation by the user, and wherein the pipeline assembler streamlines the one or more assets based on inputs and outputs of each of the one or more assets; and
based on determining that the user evaluated the solution, program instructions to make the solution available as a service on a cloud platform.

14. The computer program product method of claim 13, further comprising:
program instructions to generate the solution based on the solution API pipeline graph.

15. The computer program product of claim 14, wherein program instructions to determine that the user evaluated the solution is based on presenting the problem graph to a user using graphic user interface and receiving no input from the user.

16. The computer program product of claim 13, wherein determining the domain classification from the business problem is done using natural language processing.

17. The computer program product of claim 13, wherein retrieving one or more assets from the plurality of assets based on the domain classification and the problem graph is performed by searching for the one or more assets in an API catalog generated during a registration of the plurality of assets.

* * * * *